United States Patent
Yamanaka et al.

(10) Patent No.: US 10,662,888 B2
(45) Date of Patent: May 26, 2020

(54) CONTROL DEVICE FOR INTERNAL COMBUSTION ENGINE

(71) Applicant: Honda Motor Co., Ltd., Tokyo (JP)

(72) Inventors: Tatsuo Yamanaka, Saitama (JP); Ryuji Sato, Saitama (JP); Shoji Sasaki, Saitama (JP); Isao Komoriya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/393,896

(22) Filed: Apr. 24, 2019

(65) Prior Publication Data

US 2019/0331054 A1    Oct. 31, 2019

(30) Foreign Application Priority Data

Apr. 25, 2018    (JP) .................. 2018-084021

(51) Int. Cl.
*F02D 41/38* (2006.01)
*F02M 37/14* (2006.01)
*F02N 11/08* (2006.01)

(52) U.S. Cl.
CPC ......... *F02D 41/3836* (2013.01); *F02M 37/14* (2013.01); *F02N 11/0818* (2013.01)

(58) Field of Classification Search
CPC ......... F02D 41/3836; F02D 2200/0606; F02D 2200/0602; F02D 41/06; F02M 37/14; F02N 11/0814; F02N 11/0818
See application file for complete search history.

(56) References Cited

U.S. PATENT DOCUMENTS

2018/0112619 A1 * 4/2018 Yang .................. F02D 41/26

FOREIGN PATENT DOCUMENTS

| JP | S5875950 | 5/1983 |
|---|---|---|
| JP | H02124257 | 10/1990 |
| JP | 3099385 | 10/2000 |
| JP | 2008274956 | 11/2008 |
| JP | 2009191758 | 8/2009 |
| JP | 2012013050 | 1/2012 |
| JP | 2016003572 | 1/2016 |

OTHER PUBLICATIONS

"Office Action of Japan Counterpart Application," with English translation thereof, dated Sep. 17, 2019, p. 1-p. 6.
"Office Action of Japan Counterpart Application," with English translation thereof, dated Dec. 17, 2019, p.1-p. 6.

* cited by examiner

*Primary Examiner* — Xiao En Mo

(74) *Attorney, Agent, or Firm* — JCIPRNET

(57) ABSTRACT

A control device for internal combustion engine capable of continuously driving a feed pump during automatic stop of the internal combustion engine without increasing the size of a canister is provided. The control device include a fuel supply pump supplying fuel within a fuel tank to a fuel injection device, an automatic stop restarting control unit performing automatic stop of the engine during operation according to vehicle state and then performs automatic restart of the engine during automatic stop, a fuel pump control unit driving the fuel supply pump during operation or automatic stop of the engine, and an idling determination unit determining whether the fuel supply pump is in an idling state. The automatic stop restarting control unit performs automatic restart when the idling determination unit determines that the fuel pump is in the idling state during automatic stop.

3 Claims, 2 Drawing Sheets

CONTROL DEVICE FOR INTERNAL COMBUSTION ENGINE

CROSS REFERENCE TO RELATED APPLICATIONS

This application claims the priority benefit of Japanese patent application no. 2018-084021, filed on Apr. 25, 2018. the entirety of the above-mentioned patent application is hereby incorporated by reference herein and made a part of this specification.

BACKGROUND

Technical Field

The present disclosure relates to a control device for an internal combustion engine. More specifically, the present disclosure relates to a control device for an internal combustion engine that drives a fuel supply pump at least during operation and automatic stop of the internal combustion engine.

Description of Related Art

Most vehicles that use an internal combustion engine as a power generation source are equipped with a so-called idle stop function in order to reduce fuel consumption in the internal combustion engine. The idle stop function refers to a function of temporarily stopping the internal combustion engine in response to establishment of predetermined automatic stop conditions and then restarting the internal combustion engine in response to establishment of predetermined automatic restart conditions. Hereinafter, stopping an internal combustion engine based on such an idle stop function will be referred to as automatic stop, and starting the internal combustion engine based on the idle stop function will be referred to as automatic restart.

Incidentally, fuel stored in a fuel tank is supplied to a fuel injection device of an internal combustion engine at a predetermined fuel pressure by a feed pump provided within the fuel tank. The fuel injection device is constituted by a high-pressure pump, an injector, and the like. The high-pressure pump further boosts the pressure of fuel supplied from the feed pump and supplies the boosted pressure to the injector, and the injector is opened and closed in response to a signal transmitted from an electronic control unit to inject fuel boosted by the high-pressure pump.

For this reason, in recent years, in order to secure startability of the internal combustion engine at the time of automatic restart, a feed pump has also been continuously driven during automatic stop of an internal combustion engine, in many cases (see, for example, Japanese Patent No. 3099385). That is, since fuel is supplied to a fuel injection device at a predetermined fuel pressure at all times by also continuously driving the feed pump during automatic stop of the internal combustion engine, fuel injection using the fuel injection device can be immediately started in a case that automatic restart conditions are established thereafter, and thus it is possible to improve startability of the internal combustion engine at the time of automatic restart.

However, when a state where a remaining amount of fuel in a fuel tank is close to zero is established, a feed pump may be set to be in a so-called idling state where the feed pump sucks a gas in the tank without sufficiently pumping out the fuel. For example, when the feed pump is continuously driven in an idling state during automatic stop of the internal combustion engine, the temperature of fuel in the tank is raised due to driving heat of the feed pump, and thus a large amount of evaporated fuel may accumulate in a canister.

That is, in order to maintain the fuel pressure of fuel to be supplied to the fuel injection device at a pressure equal to or lower than a predetermined pressure, a fuel supply path connecting the feed pump and the fuel injection device may be often provided with a relief valve that opens and returns the fuel to the fuel tank when the fuel pressure exceeds the predetermined pressure. However, when the feed pump is continuously driven in the idling state during automatic stop, fuel heated by driving heat of the feed pump is returned to the fuel tank again through the relief valve, which results in an increase in the amount of evaporated fuel generated within the fuel tank. Furthermore, as described above, a large amount of evaporated fuel may accumulate in the canister. Therefore, in a case that the feed pump is also continuously driven during automatic stop of the internal combustion engine, it is necessary to mount a large-size canister so as to be capable of adsorbing a sufficient amount of evaporated fuel.

The disclosure provides a control device for an internal combustion engine also capable of continuously driving a fuel pump during automatic stop of the internal combustion engine without increasing the size of a canister.

SUMMARY

The disclosure provides a control device for an internal combustion engine, including a fuel pump which supplies fuel within a fuel tank to a fuel injection device of the internal combustion engine, an automatic stop restarting device which performs automatic stop of the internal combustion engine during operation in accordance with a state of a vehicle and then performs automatic restart of the internal combustion engine during automatic stop, a fuel pump control device which drives the fuel pump at least during operation and automatic stop of the internal combustion engine, and an idling determination unit which determines whether or not the fuel pump is in an idling state, and the automatic stop restarting device performs automatic restart of the internal combustion engine in a case that the idling determination unit determines that the fuel pump is in an idling state during automatic stop of the internal combustion engine.

DESCRIPTION OF THE EMBODIMENTS

Figure 1:
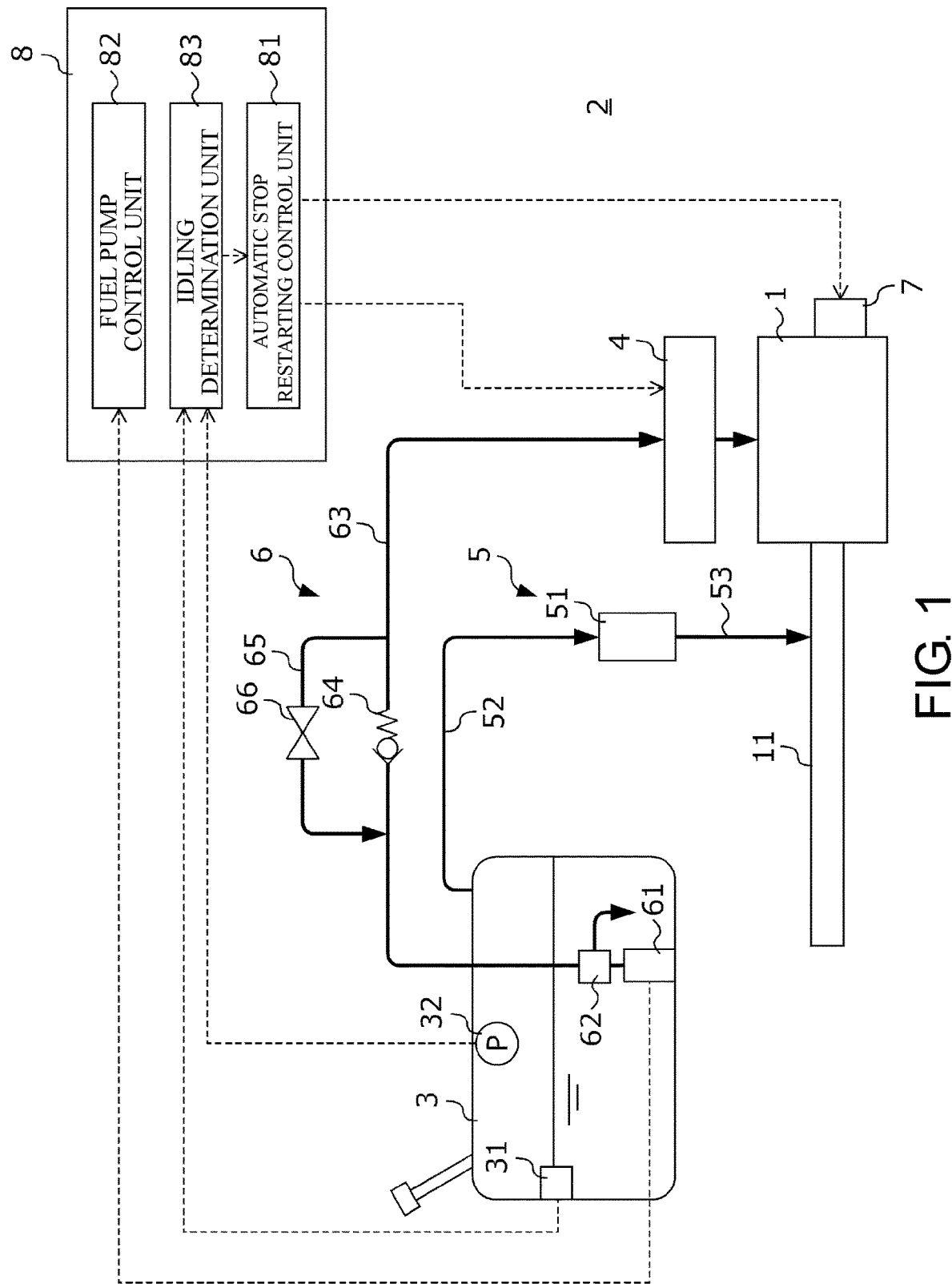
FIG. 1 is a diagram showing configurations of an engine and a control device therefor according to an embodiment of the disclosure.

Hereinafter, an embodiment of the disclosure will be described with reference to the accompanying drawings. FIG. 1 is a diagram showing configurations of an internal combustion engine 1 (hereinafter, referred to as an "engine 1") and a control device 2 therefor according to the present embodiment. The engine 1 and the control device 2 are mounted on a vehicle, not shown in the drawing, which has at least the engine 1 as a power generation source.

The engine 1 is, for example, a multi-cylinder gasoline engine using gasoline as fuel, but the disclosure is not limited thereto. The fuel is not limited to gasoline and may be diesel.

The control device 2 includes a fuel tank 3 that stores fuel of the engine 1, a fuel injection device 4 that injects fuel supplied from the fuel tank 3 into each cylinder of the engine 1 or an intake port communicating with each cylinder, an evaporated fuel processing device 5 that processes evaporated fuel generated within the fuel tank 3, a fuel supply device 6 that supplies the fuel stored in the fuel tank 3 to the fuel injection device 4, a starter 7 that is connected to a crankshaft of the engine 1 through a power transmission mechanism not shown in the drawings, and an electronic control unit 8 (hereinafter, an abbreviation of "ECU 8" is used) which controls the fuel injection device 4, the fuel supply device 6, and the starter 7.

The fuel tank 3 stores fuel supplied from the outside. A sender unit 31 that detects a remaining amount of the fuel stored in the fuel tank 3, more specifically, a liquid level, and a tank inner pressure sensor 32 that detects a pressure within the fuel tank 3 are provided within the fuel tank 3. The sender unit 31 transmits a sender signal corresponding to the position of a float (not shown) floating on a liquid level of the fuel stored in the fuel tank 3 to the ECU 8. The ECU 8 detects the remaining amount of the fuel within the fuel tank 3 based on the sender signal. The tank inner pressure sensor 32 transmits a detection signal corresponding to a pressure within the fuel tank 3 to the ECU 8.

The fuel supply device 6 includes a fuel supply pump 61 and a pressure regulator 62 which are provided in the fuel tank 3, a fuel feeding pipe 63 which connects the pressure regulator 62 and the fuel injection device 4 to each other, a check valve 64 which is provided in the fuel feeding pipe 63, a recirculation pipe 65 that bypasses the check valve 64, and a relief valve 66 which is provided in the recirculation pipe 65.

The fuel supply pump 61 pumps up the fuel from a suction port provided at the bottom within the fuel tank 3 and pressure-feeds the fuel to the pressure regulator 62. The fuel supply pump 61 is an electromagnetic pump and is driven based on an instruction signal transmitted from the ECU 8. The pressure regulator 62 regulates the pressure of the fuel pressure-fed from the fuel supply pump 61 to be less than a predetermined pressure and supplies the fuel to the fuel feeding pipe 63. More specifically, in a case where the pressure of the fuel supplied from the fuel supply pump 61 exceeds the predetermined pressure, the pressure regulator 62 returns surplus fuel to the fuel tank 3 so that the fuel pressure is made less than the predetermined pressure.

The check valve 64 allows a flow of fuel from the fuel tank 3 side to the fuel injection device 4 side and blocks a flow of fuel from the fuel injection device 4 side to the fuel tank 3 side. The relief valve 66 is opened and closed so that the fuel pressure of fuel from the check valve 64 to the fuel injection device 4 side in the fuel feeding pipe 63 is set to a predetermined pressure. That is, the relief valve 66 is opened in response to a fuel pressure of the fuel feeding pipe 63 on the fuel injection device 4 side exceeding a predetermined pressure, and fuel on the fuel injection device 4 side is returned to the fuel tank 3 side through the recirculation pipe 65. Thereby, the fuel pressure of fuel supplied to the fuel injection device 4 is maintained at the predetermined pressure.

The fuel injection device 4 is constituted by a high-pressure pump (not shown) that boosts the pressure of fuel supplied from the fuel feeding pipe 63, a plurality of injectors (not shown) injecting the fuel boosted by the high-pressure pump into each cylinder of the engine 1 or an intake port communicating with each cylinder, and the like. The high-pressure pump boosts the pressure of fuel using, for example, electric power of a crankshaft of the engine 1. In addition, each injector is opened and closed based on an instruction signal transmitted from the ECU 8 to inject fuel supplied from the high-pressure pump.

The evaporated fuel processing device 5 includes a canister 51 including an adsorbent (specifically, for example, activated carbon) which adsorbs evaporated fuel, a charge pipe 52 that connects the fuel tank 3 and the canister 51, and a purge pipe 53 that connects the canister 51 and the intake pipe 11 of the engine 1. The evaporated fuel generated within the fuel tank 3 is introduced into the canister 51 through the charge pipe 52 and is temporarily stored in the adsorbent. In addition, since a negative pressure is generated within the intake pipe 11 during operation of the engine 1, an air flow from the canister 51 to the intake air pipe 11 occurs. The evaporated fuel stored in the canister 51 flows into the intake pipe 11 through the purge pipe 53 due to the air flow and is supplied for combustion of the engine 1.

The ECU 8 is a computer constituted by an I/O interface that performs A/D conversion of a detected signal of a sensor, a RAM and a ROM that stores various control programs, data, and the like, a CPU that executes various arithmetic processes in accordance with the programs, and the like. In the ECU 8, an automatic stop restarting control unit 81, a fuel pump control unit 82, and an idling determination unit 83 are configured as control modules realized by the above-described hardware configuration.

The automatic stop restarting control unit 81 performs automatic stop of the engine during operation in accordance with the state of the vehicle or performs automatic restart of the engine during automatic stop. In addition, a specific procedure of the automatic stop or the automatic restart of the engine 1 which is performed by the automatic stop restarting control unit 81 will be described later with reference to FIG. 2.

The fuel pump control unit 82 drives the fuel supply pump 61 at least during operation of the engine 1 and during automatic stop of the engine 1 and supplies fuel within the fuel tank 3 to the fuel injection device 4.

The idling determination unit 83 determines whether or not the fuel supply pump 61 driven by the fuel pump control unit 82 is in an idling state during automatic stop of the engine 1. Here, the idling state refers to a state where the fuel supply pump 61 cannot pump out a sufficient amount of fuel from the suction port and sucks in a gas within the fuel tank 3. The idling determination unit 83 determines whether or not the fuel supply pump 61 is in the idling state with any one of the following three types of determination algorithms or a combination of these determination algorithms.

<First Determination Algorithm>

For example, when a state where a remaining amount of fuel within the fuel tank 3 is close to zero is established, the fuel level of the fuel becomes lower than the suction port of the fuel supply pump 61, and the fuel supply pump 61 may be in an idling state. Consequently, the idling determination unit 83 acquires a remaining amount of fuel within the fuel tank 3 based on, for example, a sender signal transmitted from the sender unit 31, determines that the fuel supply pump 61 is not in the idling state in a case that the remaining amount is larger than an idling determination amount determined to determine whether there is the idling state or not, and determines that the fuel supply pump 61 is in the idling state in a case that where the remaining amount is equal to or less than the idling determination amount.

Further, in a case that the fuel tank 3 is provided with a temperature sensor detecting the temperature of fuel, the idling determination unit 83 may determine whether or not the fuel supply pump 61 is in the idling state based on the sender signal and a detected signal of the temperature sensor. More specifically, the idling determination unit 83 may acquire a remaining amount of fuel and the temperature of fuel, may determine that the fuel supply pump 61 is in the idling state in a case that the remaining amount of fuel is equal to or less than the idling determination amount and the temperature of fuel is equal to or higher than an idling determination temperature determined to determine whether there is the idling state or not, and may determine that the fuel supply pump 61 is not in the idling state in a case that the remaining amount of fuel is larger than the idling determination amount or the temperature of fuel is lower than the idling determination temperature. As described in a second determination algorithm to be described later, when the fuel supply pump 61 is continuously driven in the idling state, the temperature of fuel within the fuel tank 3 is raised due to driving heat. Therefore, in this manner, an influence due to driving heat of the fuel supply pump 61 can be taken into account by determining whether or not the fuel supply pump 61 is in the idling state based on the remaining amount of fuel and the temperature of fuel, and thus it is possible to determine the idling state with a higher accuracy than in a case that determination is performed with only a remaining amount of fuel.

<Second Determination Algorithm>

When the fuel supply pump 61 is continuously driven in the idling state, fuel heated due to driving heat of the fuel supply pump 61 is returned to the fuel tank 3 through the relief valve 66, which results in an increase in the amount of evaporated fuel generated within the fuel tank 3 and an increase in pressure within the fuel tank 3. Consequently, the idling determination unit 83 determines that the fuel supply pump 61 is not in the idling state in a case that a tank inner pressure detected by, for example, the tank inner pressure sensor 32 is equal to or less than an idling determination pressure determined to determine whether there is the idling state or not, and determines that the fuel supply pump 61 is in the idling state in a case that the tank inner pressure is higher than the idling determination pressure.

<Third Determination Algorithm>

When the fuel supply pump 61 is set to be in the idling state, the fuel supply pump 61 sucks in a gas within the fuel tank 3, and thus a load of the fuel supply pump 61 is decreased. Consequently, the idling determination unit 83 calculates a pump load of the fuel supply pump 61 based on, for example, a current, a voltage, a power, and the like supplied to the fuel supply pump 61, determines that the fuel supply pump 61 is not in the idling state in a case that the pump load is higher than an idling determination load determined to determine whether there is the idling state or the like, and determines that the fuel supply pump 61 is in the idling state in a case that the calculated pump load is equal to or less than the idling determination load.

Figure 2:
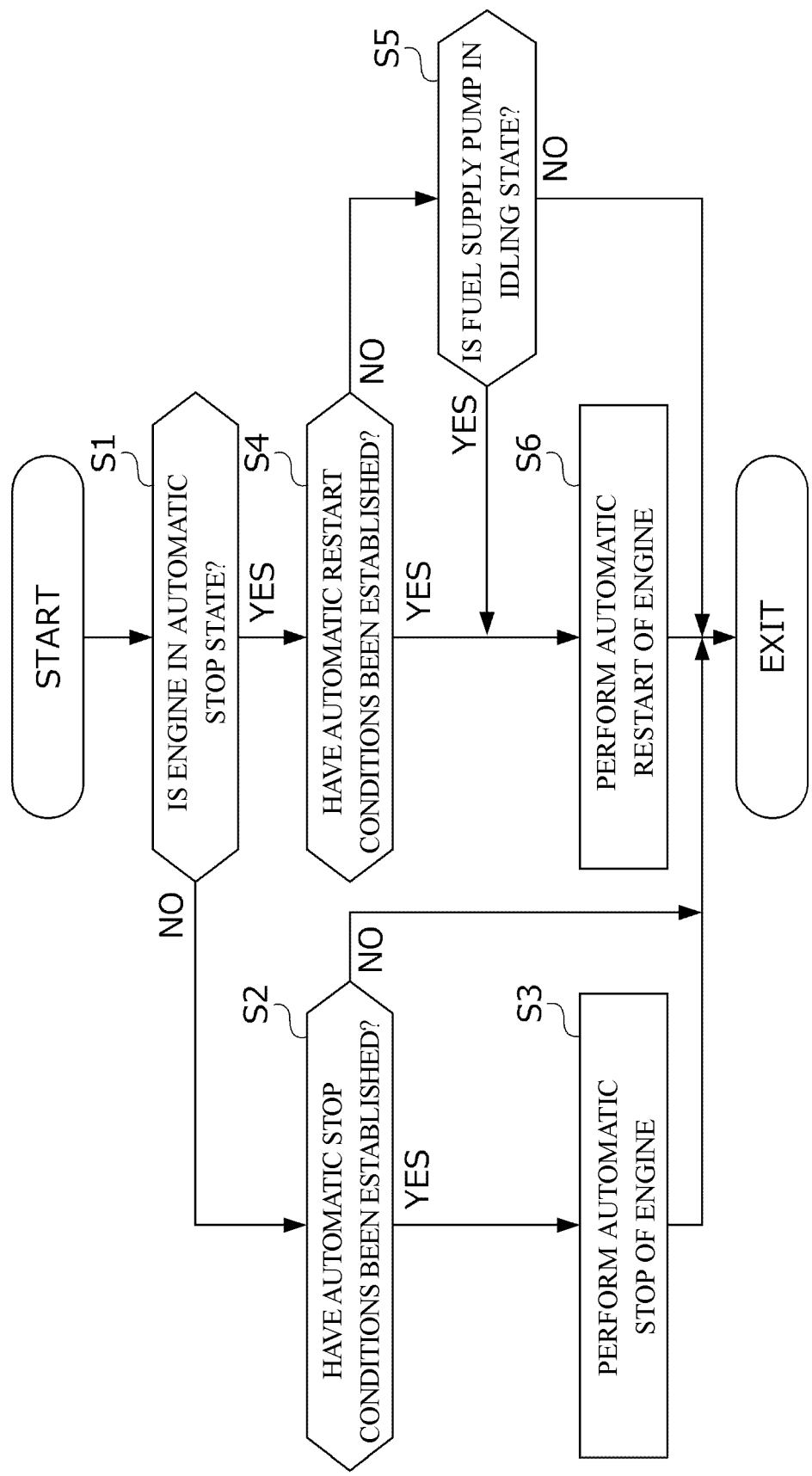
FIG. 2 is a flowchart showing a specific procedure for performing automatic stop or automatic restart of an engine in an automatic stop restarting control unit.

FIG. 2 is a flowchart showing a specific procedure for performing automatic stop or automatic restart of the engine 1 in the automatic stop restarting control unit 81. The processing shown in FIG. 2 is repeatedly executed in predetermined control cycles by the automatic stop restarting control unit 81 from when a start switch (not shown) for starting the vehicle is turned on by a driver to when the start switch is turned off to stop the vehicle by the driver.

In S1, the automatic stop restarting control unit 81 determines whether or not the engine 1 is in an automatic stop state. The automatic stop restarting control unit 81 proceeds to S2 in a case that the determination result in S1 is NO, that is, in a case that the engine 1 is during operation, and proceeds to S4 in a case that the determination result is YES, that is, in a case that the engine 1 is in an automatic stop state.

In S2, the automatic stop restarting control unit 81 determines whether or not predetermined automatic stop conditions have been established. Here, more specifically, the automatic stop conditions refer to the speed of the vehicle being substantially 0, the opening of an accelerator pedal being substantially 0, and detection of a pressing-down operation on a brake pedal. Further, in a case that the vehicle is a hybrid vehicle including a driving motor as a power generation source in addition to the engine 1, the automatic stop restarting control unit 81 may determine that the automatic stop conditions have been established also in a case that a transition to an EV mode for stopping the engine 1 and driving the vehicle using only the driving motor is performed.

In a case that the determination result in S2 is YES, the automatic stop restarting control unit 81 proceeds to S3 to perform automatic stop of the engine 1 and then terminates the processing of FIG. 2. More specifically, the automatic stop restarting control unit 81 performs automatic stop of the engine 1 by stopping fuel injection control of the fuel injection device 4. Further, in a case that the determination result in S2 is NO, the automatic stop restarting control unit 81 immediately terminates the processing of FIG. 2 without performing automatic stop of the engine 1.

In S4, the automatic stop restarting control unit 81 determines whether or not predetermined automatic restart conditions have been established. Here, more specifically, the automatic restart conditions refer to, for example, stopping a pressing-down operation of the brake pedal or detection of a pressing-down operation of the accelerator pedal. Further, in a case that the vehicle is the aforementioned hybrid vehicle, it may be determined that the automatic restart conditions have been established also in a case that a transition to an HEV mode for driving the vehicle using a driving force generated by the engine 1 is performed.

In a case that the determination result in S4 is YES, the automatic stop restarting control unit 81 proceeds to S6 to perform automatic restart of the engine 1 and then terminates the processing of FIG. 2. More specifically, the automatic stop restarting control unit 81 performs automatic restart of the engine 1 by starting fuel injection control of the fuel injection device 4 while performing cranking of the engine 1 by driving the starter 7. Further, in a case that the determination result in S4 is NO, the automatic stop restarting control unit 81 proceeds to S5.

In S5, the automatic stop restarting control unit 81 determines whether or not the idling determination unit 83 has determined that the fuel supply pump 61 is in the idling state. When the fuel supply pump 61 is continuously driven in the idling state during automatic stop of the engine 1, there is a concern that the amount of evaporated fuel generated within the fuel tank 3 may exceed an adsorption upper limit in the canister 51 as described above. Consequently, in a case that the determination result in S5 is YES, the automatic stop restarting control unit 81 proceeds to S6 even when the automatic restart conditions have not been established to perform automatic restart of the engine 1. Further, in a case that the determination result in S5 is NO, the automatic stop restarting control unit 81 immediately terminates the processing of FIG. 2 without performing automatic restart of the engine 1.

According to the control device 2 for the engine 1 of the present embodiment, the following effects are exhibited.

(1) When the fuel supply pump 61 is continuously driven in the idling state, the amount of evaporated fuel generated within the fuel tank 3 may be increased. On the other hand, in a case that the idling determination unit 83 determines that the fuel supply pump 61 is in the idling state during automatic stop of the engine 1, the automatic stop restarting control unit 81 performs automatic restart of the engine 1 even when automatic restart conditions are not established. Thereby, since evaporated fuel generated within the fuel tank 3 can be supplied for combustion of the engine 1, the fuel supply pump can be also continuously driven during automatic stop of the engine 1 without increasing the size of the canister 51 adsorbing the evaporated fuel.

(2) The idling determination unit 83 determines that the fuel supply pump 61 is in the idling state in a case that a remaining amount of fuel within the fuel tank 3 is equal to or less than a predetermined idling determination amount. Thereby, it is possible to determine whether or not the fuel supply pump 61 is in the idling state with a high accuracy using a device of the related art which is mounted on the fuel tank 3.

(3) The idling determination unit 83 determines that the fuel supply pump 61 is in the idling state based on a pressure within the fuel tank 3. Thereby, it is possible to determine whether or not the fuel supply pump 61 is in the idling state with a high level of accuracy using a device of the related art which is mounted on the fuel tank 3.

Other Configurations and Effects

The disclosure provides a control device (for example, a control device 2 as described above) for an internal combustion engine (for example, an engine 1 as described above) including a fuel pump (for example, a fuel supply pump 61 as described above) which supplies fuel within a fuel tank (for example, a fuel tank 3 as described above) to a fuel injection device (for example, a fuel injection device 4 as described above) of the internal combustion engine, an automatic stop restarting device (for example, an automatic stop restarting control unit 81 of an ECU 8 as described above) which performs automatic stop of the internal combustion engine during operation in accordance with a state of a vehicle and then performs automatic restart of the internal combustion engine during automatic stop, a fuel pump control device (for example, a fuel pump control unit 82 of the ECU 8 as described above) which drives the fuel pump at least during operation and automatic stop of the internal combustion engine, and an idling determination unit (for example, an idling determination unit 83 of the ECU 8 as described above) which determines whether or not the fuel pump is in an idling state, and the automatic stop restarting device performs automatic restart of the internal combustion engine in a case that the idling determination unit determines that the fuel pump is in an idling state during automatic stop of the internal combustion engine.

In this case, it is preferable that the idling determination unit include a remaining amount sensor (for example, a sender unit 31 as described above) which detects a remaining amount of the fuel within the fuel tank; and a determination part that determines that the fuel pump is in the idling state in a case where the remaining amount detected by the remaining amount sensor is equal to or less than a predetermined amount.

In this case, it is preferable that the idling determination unit include a pressure sensor (for example, a tank inner pressure sensor 32 as described above) which detects a pressure within the fuel tank; and a determination part that determines that the fuel pump is in the idling state in a case that the pressure detected by the pressure sensor is higher than a predetermined pressure.

As described above, when a fuel pump is continuously driven in the idling state, the amount of evaporated fuel generated within the fuel tank may be increased. On the other hand, in the disclosure, an automatic stop restarting device performs automatic restart of an internal combustion engine in a case that the idling determination unit determines that the fuel pump is in the idling state during automatic stop of the internal combustion engine. Thereby, since the evaporated fuel generated within the fuel tank can be supplied for combustion of the internal combustion engine, the fuel pump can be also continuously driven during automatic stop of the internal combustion engine without increasing the size of a canister adsorbing the evaporated fuel.

As described above, when the remaining amount of the fuel within the fuel tank approaches zero, the fuel pump is easily set to be in the idling state. That is, there is a correlation between the remaining amount of fuel within the fuel tank and whether being in the idling state or not. Consequently, in the disclosure, the idling determination unit determines that the fuel pump is in the idling state in a case that the remaining amount of fuel within the fuel tank is equal to or less than the predetermined amount. Thereby, it is possible to determine whether or not the fuel pump is in the idling state with a high accuracy using a device of the related art which is mounted on the fuel tank.

As described above, when the fuel pump is continuously driven in the idling state, the fuel pump may suck in not only fuel but also air within the fuel tank and supply the sucked-in fuel and air to a fuel supply device. Further, in this case, fuel and gas which are heated due to driving heat of the fuel pump may be returned to the fuel tank by a relief valve as described above, which may result in an increase in pressure within the fuel tank. That is, there is a correlation between the pressure within the fuel tank and whether being in the idling state or not. Consequently, in the disclosure, the idling determination unit determines that the fuel pump is in the idling state based on a pressure within the fuel tank. Thereby, it is possible to determine whether or not the fuel pump is in the idling state with a high accuracy using a device of the related art which is mounted on the fuel tank.

While an embodiment of the disclosure has been described above, the disclosure is not limited thereto. Configurations of details may be appropriately changed within the scope of the disclosure.

What is claimed is:

1. A control device for an internal combustion engine, comprising:

a fuel pump that supplies fuel within a fuel tank to a fuel injection device of the internal combustion engine;

an automatic stop restarting device that performs automatic stop of the internal combustion engine during operation according to a state of a vehicle and then performs automatic restart of the internal combustion engine during automatic stop;

a fuel pump control device that drives the fuel pump at least during operation and during automatic stop of the internal combustion engine; and an idling determination unit that determines whether or not the fuel pump is in an idling state, wherein the automatic stop restarting device performs automatic restart of the internal combustion engine in a case that the idling determination unit determines that the fuel pump is in an idling state during automatic stop of the internal combustion engine.

2. The control device for the internal combustion engine according to claim 1,
wherein the idling determination unit comprises:
a remaining amount sensor that detects a remaining amount of the fuel within the fuel tank; and
a determination part that determines that the fuel pump is in the idling state in a case that the remaining amount detected by the remaining amount sensor is equal to or less than a predetermined amount.

3. The control device for the internal combustion engine according to claim 1,
wherein the idling determination unit comprises:
a pressure sensor that detects a pressure within the fuel tank; and
a determination part that determines that the fuel pump is in the idling state in a case that the pressure detected by the pressure sensor is higher than a predetermined pressure.

\* \* \* \* \*